(12) United States Patent
Chee et al.

(10) Patent No.: US 11,121,563 B2
(45) Date of Patent: Sep. 14, 2021

(54) POWER CONTROL CIRCUIT (71) Applicant: ASUSTeK COMPUTER INC., Taipei (TW)

(72) Inventors: Kian-Ming Chee, Taipei (TW); Kai-Chun Liang, Taipei (TW); Tao Chen, Taipei (TW); Wei-Chen Tu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 161 days.

(21) Appl. No.: 16/424,610

(22) Filed: May 29, 2019

(65) Prior Publication Data
US 2020/0212685 A1 Jul. 2, 2020

(30) Foreign Application Priority Data
Dec. 27, 2018 (CN) .......................... 201811609180.8

(51) Int. Cl.
H02J 7/00 (2006.01)

(52) U.S. Cl.
CPC .............. H02J 7/0018 (2013.01); H02J 7/00 (2013.01); H02J 7/0029 (2013.01); H02J 7/00302 (2020.01)

(58) Field of Classification Search
CPC ...... H02J 7/0018; H02J 7/0052; H02J 7/0029; H02J 7/00; H02J 7/00302; H02J 2007/0037; H02J 2007/0062
USPC ....................................................... 320/138
See application file for complete search history.

(56) References Cited

U.S. PATENT DOCUMENTS

| 7,439,797 | B2 * | 10/2008 | Byeon | .................... G11C 5/145 327/540 |
| 2008/0192399 | A1 * | 8/2008 | Chen | ..................... H02J 7/0031 361/115 |
| 2010/0264893 | A1 * | 10/2010 | Li | ........................... H02J 9/005 323/282 |
| 2013/0313904 | A1 * | 11/2013 | Kayama | .................... G06F 1/26 307/26 |
| 2014/0300311 | A1 * | 10/2014 | Caren | ................. H01M 10/425 320/103 |

(Continued)

FOREIGN PATENT DOCUMENTS

CN 206908342 U 1/2018

Primary Examiner — Richard Isla
Assistant Examiner — Dung V Bui
(74) Attorney, Agent, or Firm — McClure, Qualey & Rodack, LLP (57) ABSTRACT A power control circuit is disclosed. The power control circuit includes a first receiving circuit, a second receiving circuit, a first power supply circuit and a second power supply circuit. The first receiving circuit is electrically connected to a charging circuit and a first port and configured to charge a power unit according to a first port voltage. The second receiving circuit is electrically connected to the charging circuit and a second port and configured to charge the power unit according to a second port voltage. The second receiving circuit is further configured to be disabled according to the first port voltage. The first power supply circuit is configured to supply power to the first port. The second power supply circuit is configured to supply power to the second port. Thus, the power control circuit transmits power or data through different ports.

20 Claims, 4 Drawing Sheets (56) References Cited

U.S. PATENT DOCUMENTS

| | | | |
|---|---|---|---|
| 2014/0327315 A1* | 11/2014 | Baba | H02J 3/46 |
| | | | 307/81 |
| 2015/0130587 A1* | 5/2015 | Lydecker | H05B 47/105 |
| | | | 340/4.31 |
| 2016/0077562 A1* | 3/2016 | Smith | G06F 1/263 |
| | | | 713/310 |
| 2016/0227628 A1* | 8/2016 | Lydecker | H05B 47/19 |
| 2016/0276836 A1* | 9/2016 | Tanaka | H02J 7/345 |
| 2016/0380455 A1* | 12/2016 | Greening | H02J 7/0044 |
| | | | 320/114 |
| 2017/0063140 A1* | 3/2017 | Lee | H02J 50/10 |
| 2018/0019609 A1* | 1/2018 | Kammerlander | H02J 7/008 |
| 2018/0019698 A1* | 1/2018 | Kim | H02J 9/062 |
| 2018/0097442 A1* | 4/2018 | Niu | G05F 5/00 |
| 2018/0316180 A1* | 11/2018 | Batenburg | H02H 3/20 |

* cited by examiner

POWER CONTROL CIRCUIT

CROSS-REFERENCE TO RELATED APPLICATION

This application claims the priority benefit of Chinese application serial No. 201811609180.8, filed on Dec. 27, 2018. The entirety of the above-mentioned patent application is hereby incorporated by reference herein and made a part of the specification.

BACKGROUND OF THE INVENTION

Field of the Invention

The disclosure relates to a power control circuit, particularly capable of receiving power and supplying the power to a mobile electronic device, or supplying the power to an external device.

Description of the Related Art

A connecting port is an important bridge for transmitting power or data for electronic devices. When an electronic device is used and a connector of an external device plugs into the connecting port of the electronic device, and power, data or signals will receive and transmit between the electronic device and the external device.

Some types of the electronic device need to supply power to the external device or receive power supplied by the external device. The magnitude of the received/supplied power varies with the type of the external device, so the electronic device needs a power control circuit for transmitting or receiving power according to different situations. How to improve the operability and convenience of the power control circuit is the subject of the field.

BRIEF SUMMARY OF THE INVENTION

The disclosure is to provide a power control circuit capable of transmitting power or data through different connecting ports.

An embodiment of the disclosure provides a power control circuit. The power control circuit includes a first receiving circuit, a second receiving circuit, a first power supply circuit and a second power supply circuit. The first receiving circuit is electrically connected to a charging circuit and a first port. The first receiving circuit is configured to charge a power unit through the charging circuit according to a first port voltage. The second receiving circuit is electrically connected to the charging circuit and a second port. The second receiving circuit is configured to charge the power unit through the charging circuit according to a second port voltage. The second receiving circuit is further configured to be disabled according to the first port voltage. The first power supply circuit is electrically connected to the power unit and the first port. The first power supply circuit is enabled according to a first transmission signal to supply power to the first port. The second power supply circuit is electrically connected to the power unit and the second port. The second power supply circuit is enabled according to a second transmission signal to supply power to the second port.

Another embodiment of the disclosure provides a power control circuit, including a first receiving circuit, a second receiving circuit, a first power supply circuit and a second power supply circuit. The first receiving circuit is electrically connected to a charging circuit and a first port. The first receiving circuit is configured to generate a first charging voltage according to a first port voltage, and charge a power unit through the charging circuit. The second receiving circuit is electrically connected to the charging circuit and a second port. The second receiving circuit is configured to charge the power unit through the charging circuit according to a second port voltage. The second receiving circuit is further configured to be disabled according to the first charging voltage. The first power supply circuit is electrically connected to the power unit and the first port. The first power supply circuit is enabled according to a first transmission signal to supply power to the first port. The second power supply circuit is electrically connected to the power unit and the second port. The second power supply circuit is enabled according to a second transmission signal to supply power to the second port.

Accordingly, the power control circuit selectively receives power or transmit data from the first port or the second port, so that the convenience of the power control circuit is improved. In addition, when both the first port and the second port receive the corresponding port voltage, the second receiving circuit is disabled along with the enabling of the first receiving circuit, that is, the power control circuit preferentially uses the first receiving circuit to charge the power unit, thereby avoiding the problem of power conflict.

DETAILED DESCRIPTION OF THE EMBODIMENTS

Various embodiments of the disclosure are disclosed in the accompanying drawings, and for purposes of clarity of illustration, numerous practical details are set forth in the following description. It should be understood, however, that these practical details are not intended to limit the disclosure. That is, in some embodiments of the disclosure, such practical details are unnecessary. In addition, some well-known and customary structures and elements are shown in the drawings in a simple schematic manner for the sake of simplifying the drawings.

As used herein, an element, when referred to as "connected" or "coupled", may refer to "electrically connected" or "electrically coupled". "Connected" or "coupled" may also be used to mean that two or more elements cooperate or interact with each other. Furthermore, although terms such as "first" and "second" are used to describe different elements herein, the terms are only intended to distinguish elements or operations described with same technical terms. Unless the context clearly indicates otherwise, the terms neither indicate or imply a sequence or an order, nor limit the disclosure.

Figure 1:
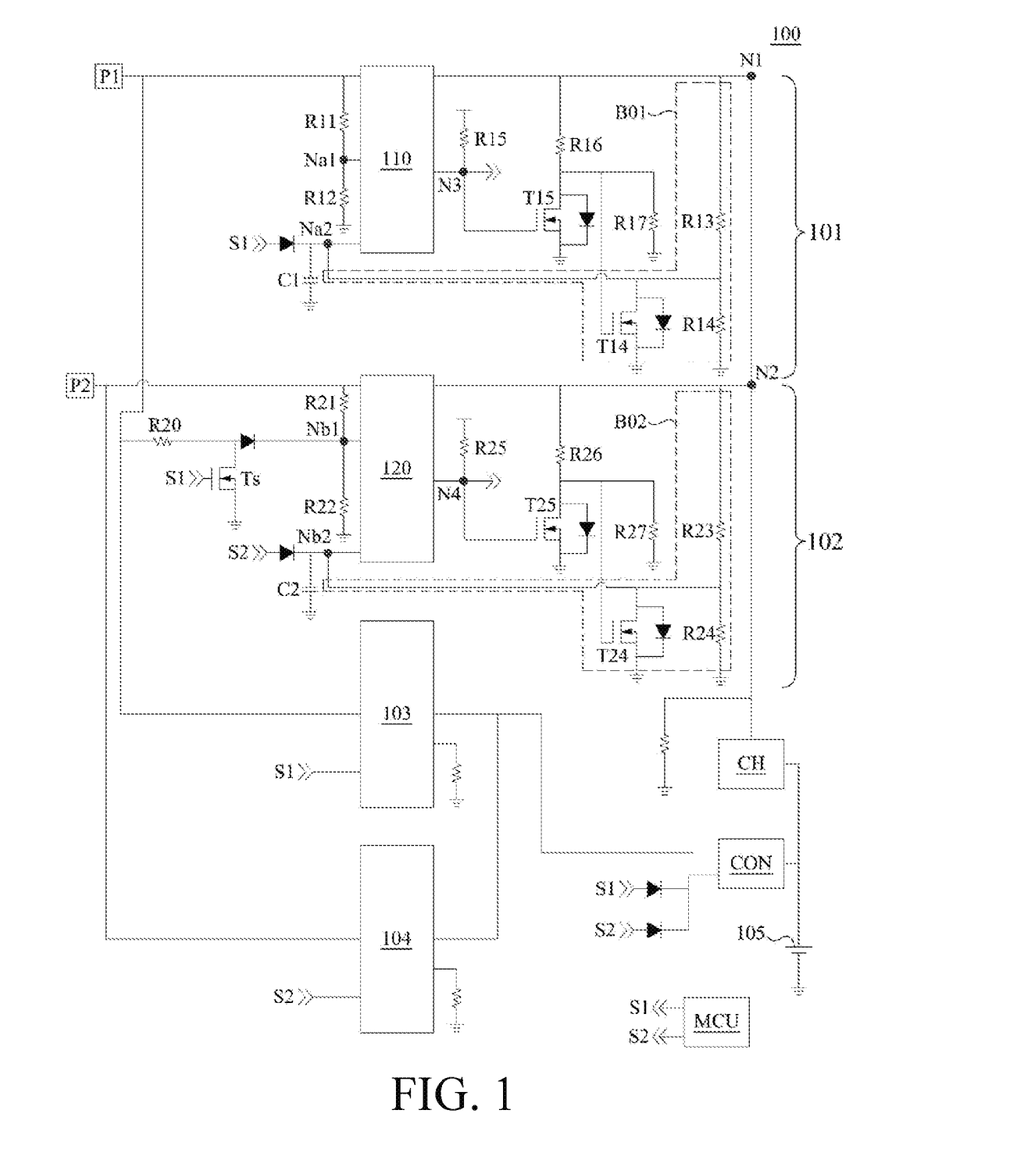
FIG. 1 is a schematic diagram of a power supply control circuit according to an embodiment of the disclosure.

Referring to FIG. 1, the disclosure relates to a power control circuit 100. The power control circuit 100 includes a first receiving circuit 101, a second receiving circuit 102, a first power supply circuit 103 and a second power supply circuit 104. In some embodiments, the power control circuit 100 is applied to a mobile electronic device (e.g., a smart phone, a tablet computer). The mobile electronic device is provided with a first port P1 and a second port P2. The first port P1 and the second port P2 are connectors to be connected with a transmission device (e.g., a signal transmission line). The mobile electronic device is electrically connected to an external device (e.g., a personal computer or a flash drive) through the transmission device to transmit power or data.

In some embodiments, the mobile electronic device is internally provided with a charging circuit CH, a conversion circuit CON and a power unit 105. The charging circuit CH is electrically connected to the power unit 105 to stabilize the current transmitted from the transmission device so as to charge the power unit 105. The conversion circuit CON is configured to boost or buck voltage signals provided by the power unit 105 to output power supply current. The power unit 105 is an energy storage battery within the mobile electronic device.

When the transmission device is plugged into the first port P1 or the second port P2 to electrically connect the power control circuit 100 with the external device, corresponding voltages (here referred to as a first port voltage V1 and a second port voltage V2) are generated on the first port P1 and the second port P2. The magnitudes of the first port voltage V1 and the second port voltage V2 differ according to the type of the external device. In an embodiment, the first port P1 is electrically connected to a mobile power supply through the transmission device, when the mobile power supply supplies power to the power control circuit 100, the first port voltage V1 is 9 volts. In an embodiment, the first port P1 is electrically connected to a flash drive through the transmission device, since the flash drive itself does not have a power supply, the first port voltage V1 is zero. When the mobile electronic device detects that the flash drive is connected with the first port P1, power is supplied to the flash drive through the power control circuit 100 to raise the first port voltage V1 to 5 volts, so that the flash drive are read and wrote data with the mobile electronic device.

The first receiving circuit 101 is electrically connected to the charging circuit CH and the first port P1. When the transmission device is plugged into the first port P1, the first receiving circuit 101 is configured to charge the power unit 105 through the charging circuit CH according to the first port voltage V1.

The second receiving circuit 102 is electrically connected to the charging circuit CH and the second port P2. When the transmission device is plugged into the second port P2, the second receiving circuit 102 is configured to charge the power unit 105 through the charging circuit CH according to the second port voltage V2. In some embodiments, the first port P1 and the second port P2 are located on different sides of the mobile electronic device (e.g., on the bottom side and the right side of the mobile electronic device), so that the user can plug the transmission device into different positions of the mobile electronic device.

The first power supply circuit 103 is electrically connected to the first port P1 and electrically connected to the power unit 105 through the conversion circuit CON. The first power supply circuit 103 is enabled according to a first transmission signal S1 to supply power to the first port P1.

The second power supply circuit 104 is electrically connected to the second port P2 and electrically connected to the power unit 105 through the conversion circuit CON. The second power supply circuit 104 is enabled according to a second transmission signal S2 to supply power to the second port P2.

In some embodiments, when the external device is a storage device such as a flash drive, a processor MCU of the mobile electronic device determines whether the detection terminal on the first port P1 or the second port P2 is electrically connected to a specific potential. If yes, it means the external device needs power to be driven. At this time, the processor MCU generates the first transmission signal S1 or the second transmission signal S2 to drive the first power supply circuit 103 or the second power supply circuit 104 to supply power to the external device.

In the disclosure, since the two receiving circuits 101 and 102 respectively corresponding to different ports P1 and P2 are configured in the power control circuit 100, the user can randomly select the first port P1 or the second port P2 to charge the power unit 105. Accordingly, it is more convenient for the user that the mobile electronic device transmits power and reads/writes data through the first port P1 or the second port P2. In addition, the first receiving circuit 101 and the second receiving circuit 102 are electrically connected to the same charging circuit CH. Therefore, the design of the two receiving circuits 101 and 102 is not greatly affected the manufacturing cost thereof.

If the first receiving circuit 101 and the second receiving circuit 102 simultaneously charge the charging circuit CH, a voltage difference between the first port P1 and the second port P2 causes the current to be recharged to the first port P1 or the second port P2. In order to avoid this problem, in some embodiments, the second receiving circuit 102 is configured to be disabled according to the first port voltage V1, and the charging circuit CH is preferentially charged by the first receiving circuit 101. In another embodiment, when the first receiving circuit 101 charges according to the first port voltage V1, the output end thereof generates a first charging voltage. The first charging voltage passes through a feedback path to disable the second receiving circuit 102. That is, the first receiving circuit 101 has a higher charging priority than the second receiving circuit 102. When two external devices charge the power unit 105 through the first port P1 and the second port P2, the power control circuit 100 only enables the first receiving circuit 101, and disables the second receiving circuit 102 to avoid the problem of current conflict.

Figure 2A:
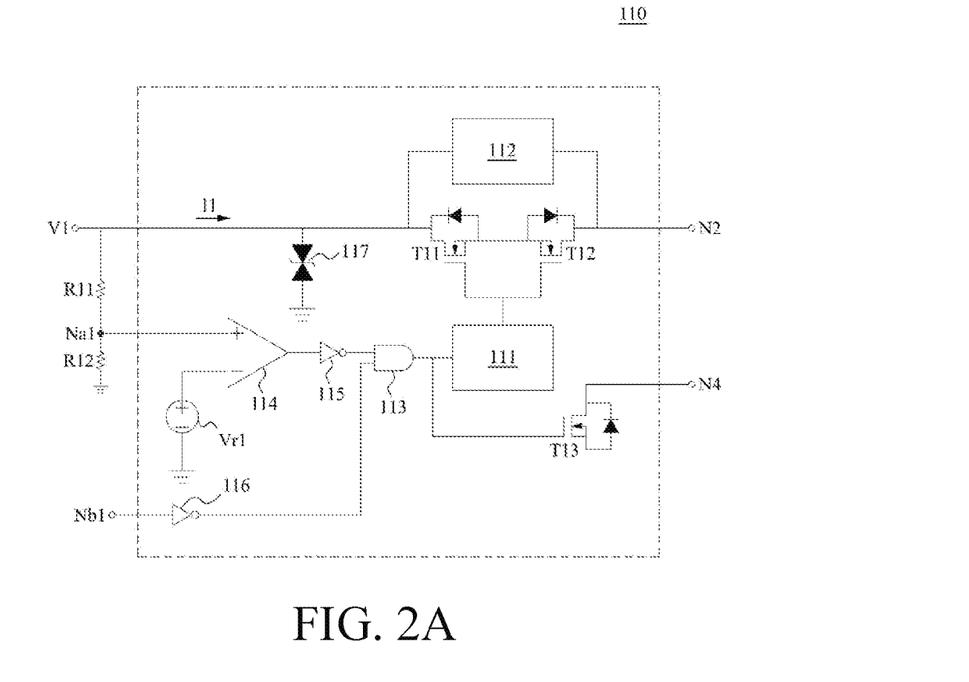
FIG. 2A is a schematic diagram of a first receiving circuit according to an embodiment of the disclosure.
Figure 2B:
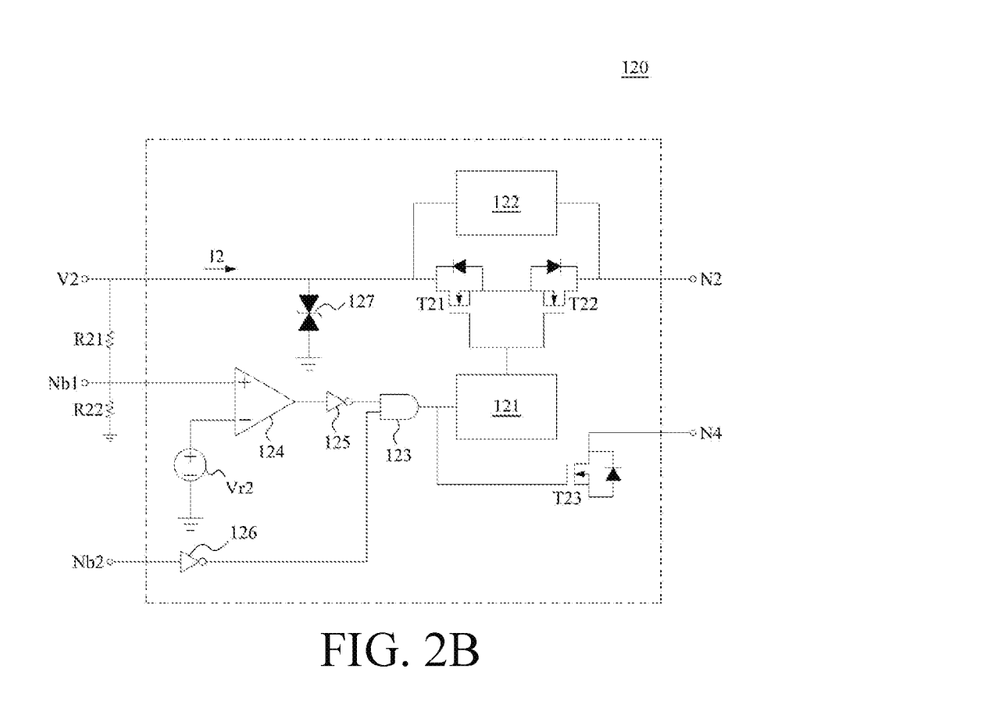
FIG. 2B is a schematic diagram of a second receiving circuit according to an embodiment of the disclosure.

Referring to FIG. 1, FIG. 2A and FIG. 2B, in some embodiments, the first receiving circuit 101 includes a first protection circuit 110. The second receiving circuit 102 includes a second protection circuit 120. FIG. 2A is a schematic diagram of the first protection circuit 110 according to an embodiment of the disclosure, and FIG. 2B is a schematic diagram of the second protection circuit 120 according to an embodiment of the disclosure. The first protection circuit 110 is electrically connected to the first port P1, and the second protection circuit 120 is electrically connected to the first port P1 and the second port P2 to disable the second receiving circuit 102 according to the first port voltage V1.

To facilitate an understanding of the operation of the disclosure, the structure of the protection circuit in some embodiments of the disclosure is described as follows. Referring to FIG. 2A, the first protection circuit 110 includes a first driving circuit 111. The output end of the first driving circuit 111 is configured to turn on or off a first switch unit to transmit a first current I1 to the charging circuit CH according to the first port voltage V1. In this embodiment, the first switch unit includes two transistor switches T11 and T12 and a reverse current protection circuit 112. However, the disclosure is not limited thereto, and other types of switch components are also available.

In some embodiments, the first protection circuit 110 further includes a first gate circuit 113 and a first comparator 114. The two input ends of the first comparator 114 are respectively configured to receive the first port voltage V1 and a first reference voltage Vr1. The output end of the first comparator 114 is electrically connected to one input end of the first gate circuit 113 through an inverter 115. The other input end of the first gate circuit 113 receives the first transmission signal S1 through an inverter 116. As shown in FIG. 2A, after the first port voltage V1 is divided by resistors R11 and R12, if the voltage value after the voltage division is smaller than the first reference voltage Vr1, the first comparator 114 outputs a disable signal (e.g., a low potential voltage), the disable signal is converted into an enable signal (e.g., a high potential voltage) through the inverter 115, and therefore, in the case where the first protection circuit 110 does not receive the first transmission signal S1, the signals at the two input ends of the first gate circuit 113 are all enable signals, which enable the first driving circuit 111 to turn on the first switch unit. The first gate circuit 113 at least includes a logic gate.

Conversely, if the voltage value of the first port voltage V1 divided by the resistors R11 and R12 is greater than the first reference voltage Vr1, it means that the voltage of the first port P1 is abnormal, and the first protection circuit 110 does not enable the first switch unit to charge the power unit 105. Moreover, if the first protection circuit 110 receives the first transmission signal S1, one of the input ends of the first gate circuit 113 is controlled at the disable level, so that the first driving circuit 111 turns off the first switch unit. Thus, the problem of circuit conflict caused by the fact that the first port P1 outputs power through the first power supply circuit 103 while receiving power through the first receiving circuit 101 is avoided.

Referring to FIG. 2B, in some embodiments, the circuit structure of the second protection circuit 120 is the same as that of the first protection circuit 110, and includes a second driving circuit 121, a second switch unit including two transistors T21 and T22, a second reverse current protection circuit 122, a second gate circuit 123, a second comparator 124, and inverters 125,126. The second protection circuit 120 also transmits a second current I2 to the power unit 105 according to the second port voltage V2, and configures to disable the second receiving circuit 102 according to the second transmission signal S2. Since the circuits shown in FIG. 2A and FIG. 2B operate in the same manner, they are not repeatedly described herein. However, in other embodiments, the circuit structure of the second protection circuit 120 does not need to be the same as that of the first protection circuit 110. The component configuration in the first protection circuit 110 or the second protection circuit 120 can be adjusted according to requirements. The second gate circuit 123 at least includes a logic gate.

As shown in FIG. 1, FIG. 2A and FIG. 2B, in some embodiments, the two input ends Nb1, Nb2 of the second protection circuit 120 are configured to control the second driving circuit 121. In addition to receiving the divided voltage of the second port voltage V2, the input end Nb1 of the second protection circuit 120 is electrically connected to the first port P1 through a resistor R20. The impedance value of the resistor R20 is much smaller than that of a resistor R21. Thus, when the first receiving circuit 101 charges the power unit 105 according to the first port voltage V1, the voltage value of the first port voltage V1 divided by the resistors R20 and R22 is greater than a second reference voltage Vr2, so that the second protection circuit 120 disables the second receiving circuit 102.

In some embodiments, the second receiving circuit 102 further includes a discharge branch. The other input end Nb1 of the second protection circuit 120 is electrically connected to the discharge branch. The discharge branch is electrically connected to the grounding end through a discharge switch Ts. The discharge switch Ts is turned on according to the first transmission signal S1, so that when the first power supply circuit 103 receives the first transmission signal S1 to supply power to the first port P1, the first port voltage V1 is connected to the grounding end through the discharge switch Ts, instead of being connected to the second protection circuit 120. In the case that the second protection circuit 120 stops receiving the first port voltage V1, the second port P2 does not turn off the charging state of the second protection circuit 120 when the first power supply circuit 103 supplies power to the first port P1.

Referring to FIG. 1, FIG. 2A and FIG. 2B, the first protection circuit 110 generates a first charging voltage to disable the second receiving circuit 102 as follows. In some embodiments, the output end of the first receiving circuit 101 is a first node N1, and the first receiving circuit 101 further includes a first feedback circuit B01. The output end of the second receiving circuit 102 is a second node N2, the second node N2 is electrically connected to the first node N1, and the second receiving circuit 102 further includes a second feedback circuit B02. The first feedback circuit B01 and the second feedback circuit B02 are electrically connected to the first protection circuit 110 and the second protection circuit 120. In this embodiment, the first feedback circuit B01 is electrically connected to the first node N1 and the inverter 116. The second feedback circuit B02 is electrically connected to the second node N2 and the inverter 126.

One input end (Na2 as shown in FIG. 1) of the first protection circuit 110 is electrically connected to the output end (i.e., the second node N2) of the second protection circuit 120 through the first feedback circuit B01. Similarly, one input end (Nb2 shown in FIG. 1) of the second protection circuit 120 is electrically connected to the output end (i.e., the first node N1) of the first protection circuit 110 through the second feedback circuit B02. In one embodiment, the first receiving circuit 101 and the second receiving circuit 102 are not enabled at the same time.

In some embodiments, when the first driving circuit 111 turns on the first switch unit (i.e., turns on the transistor switches T11, T12) according to the first port voltage V1, a first charging voltage corresponding to the first port voltage V1 is generated on the first node N1 and the second node N2. At this time, the second feedback circuit B02 feeds back the first charging voltage to one input end of the second protection circuit 120 (e.g., the input end of the inverter 126). Since the first charging voltage is regarded as an enable signal, the second driving circuit 121 is controlled through the second gate circuit 123 to turn off the second switch unit (i.e., turn off the transistor switches T21, T22).

Similarly, when the second driving circuit 121 turns on the second switch unit (i.e., turns on the transistor switches T21, T22) according to the second port voltage V2, a second charging voltage is also generated on the second node N2. The first feedback circuit B01 feeds back the second charging voltage to one input end of the first protection circuit 110

(e.g., the input end of the inverter 116), so that the first driving circuit 111 turns off the first switch unit (i.e., turns off the transistor switches T11, T12).

In some embodiments, the first feedback circuit B01 further includes a first feedback switch T14. The first feedback switch T14 is electrically connected to one input end of the first protection circuit 110 (e.g., the input end of the inverter 116) and the grounding end. When the first receiving circuit 101 charges the power unit 105, the output signal of the first protection circuit 110 turns on the first feedback switch T14, so that the first charging voltage on the first node N1 is divided by resistors R13, R14 and then guided to the grounding end instead of the first protection circuit 110. Accordingly, the problem that the first charging voltage generated when the first receiving circuit 101 charges the power unit 105 reversely affects the first protection circuit 110 is avoided.

In some embodiments, as shown in FIG. 1 and FIG. 2A, the first protection circuit 110 controls the voltage value of a third node N3 by turning on a transistor T13 so as to turn on the first feedback switch T14. The first receiving circuit 101 further includes a first control circuit. The first control circuit includes resistors R15, R16, R17 and a transistor T15. When the first receiving circuit 101 charges the power unit 105, the transistor T13 is turned on, so that the potential of the third node N3 is at a low potential. At this time, the transistor T15 is turned off, and the first charging voltage is divided by the resistors R15 and R16 to turn on the first feedback switch T14.

Moreover, the process that the first protection circuit 110 turns on the transistor T14 according to the first port voltage V1 is likely to delay. Therefore, in order to avoid the first feedback switch T14 is not turned on in real time, the first feedback circuit B01 is also electrically connected to the grounding end through a first capacitor C1 in some embodiments. Accordingly, if the first feedback switch T13 is not turned on in real time, the first charging voltage needs to charge the first capacitor C1 first and then affects the first protection circuit 110. The charging time of the first capacitor C1 ensures that the first feedback switch T14 is turned on by the first protection circuit 110.

Similarly, as shown in FIG. 1 and FIG. 2B, the second feedback circuit B02 also includes a second feedback switch T24, and the second feedback switch T24 is electrically connected to one input end of the second protection circuit 120 (e.g., the input end of the inverter 126) and the grounding end. When the second receiving circuit 102 charges the power unit 105 through the charging circuit CH, the second feedback switch T24 is turned on to avoid the problem that when the second receiving circuit 102 charges the power unit 105, the revers of the second charging voltage on the second node N2 affects the second protection circuit 120.

Moreover, the second protection circuit 120 controls the voltage value of a fourth node N4 by turning on a transistor T23 to turn on the second feedback switch T24. The second receiving circuit 102 further includes a second control circuit. The second control circuit includes resistors R25, R26, R27 and a transistor T25, and is electrically connected to a second capacitor C2. Since the second protection circuit 120, the second control circuit and the second feedback circuit B02 operate in the same manner as the first receiving circuit 101, they are not described herein.

In some embodiments, the first protection circuit 110 and the second protection circuit 120 are respectively provided with a first clamping circuit 117 and a second clamping circuit 127 for controlling the voltage values input by the first port P1 and the second port P2.

Figure 2C:
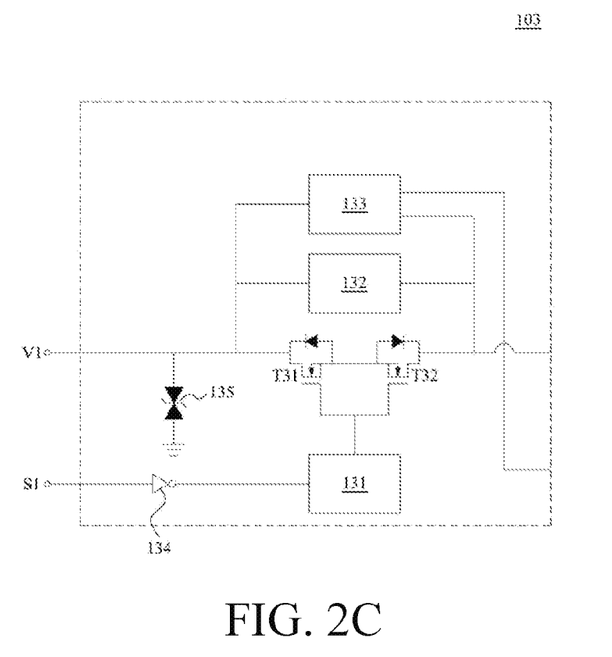
FIG. 2C is a schematic diagram of a first power supply circuit according to an embodiment of the disclosure.
Figure 2D:
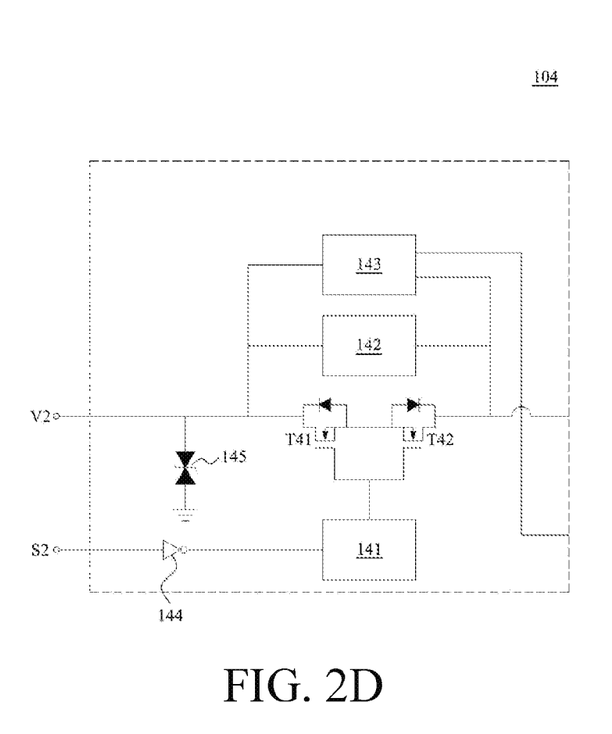
FIG. 2D is a schematic diagram of a second power supply circuit according to an embodiment of the disclosure.

Referring to FIG. 1, FIG. 2C and FIG. 2D, FIG. 2C is a schematic diagram of a first power supply circuit 103 according to an embodiment of the disclosure, and FIG. 2D is a schematic diagram of a second power supply circuit 104 according to an embodiment of the disclosure. In some embodiments, the first power supply circuit 103 includes a third driving circuit 131, a third reverse current protection circuit 132, an open current clamping circuit 133, and a third clamping circuit 135. The third driving circuit 131 is configured to turn on or off a third switch unit, so that the output power provided by the power unit 105 is transmitted to the first port P1 through the first power supply circuit 103 after passing through the conversion circuit CON. In some embodiments, the third switch unit includes transistors T31, T32. In addition, the third driving circuit 131 receives the first transmission signal S1 through an inverter 134. When the first transmission signal S1 is an enable signal, the third driving circuit 131 is configured to turn on the transistors T31, T32. Since the embodiments of the reverse current protection circuit and the open current clamping circuit are understood by those skilled in the art, they are not described herein.

Similarly, as shown in FIG. 1, FIG. 2C and FIG. 2D, in some embodiments, the second power supply circuit 104 includes a fourth driving circuit 141, a fourth reverse current protection circuit 142, a fourth open current clamping circuit 143, and a fourth clamping circuit 145. The fourth driving circuit 141 is configured to turn on or off a fourth switch unit, so that the output power provided by the power unit 105 is transmitted to the second port P2 through the second power supply circuit 104 after passing through the conversion circuit CON. In some embodiments, the fourth switch unit includes transistors T41, T42. In addition, the fourth driving circuit 141 receives the second transmission signal S2 through an inverter 144. When the second transmission signal S2 is an enable signal, the fourth driving circuit 141 is configured to turn on the transistors T41, T42.

Figure 3:
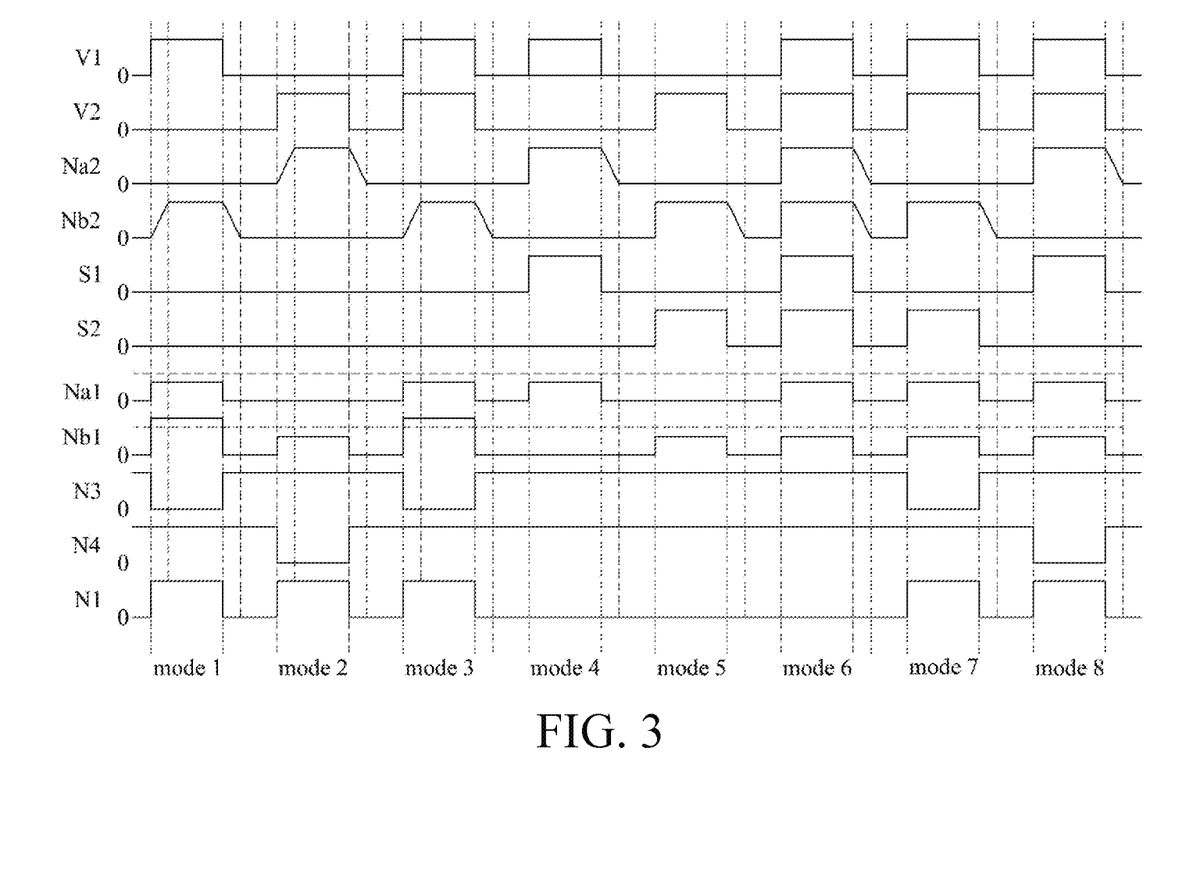
FIG. 3 is a schematic diagram of voltages of respective nodes of a power control circuit according to an embodiment of the disclosure.

Please refer to FIG. 3, which is a schematic diagram of voltages of respective nodes of a power control circuit according to an embodiment of the disclosure. Na1 and Na2 are two input ends of the first protection circuit 110, and are configured to determine whether the first driving circuit 111 turns on the transistor switches T11 and T12. Nb1 and Nb2 are two input ends of the second protection circuit 120, and are configured to determine whether the second driving circuit 121 turns on the transistor switches T21 and T22. Further, in this embodiment, since the first node N1 and the second node N2 are short-circuited, the potentials of the two are the same.

Based on the above, in some embodiments, the power control circuit 100 includes eight operation modes. In the first operation mode, namely mode 1, the first receiving circuit 101 charges the power unit 105 according to the first port voltage V1. At this time, no transmission device is plugged into the second port P2, so the first power supply circuit 103 and the second power supply circuit 104 do not operate, and the second receiving circuit 102 is disabled according to the first port voltage V1.

In the second operation mode, namely mode 2, the second receiving circuit 102 charges the power unit 105 according to the second port voltage V2. At this time, no transmission device is plugged into the first port P1, so the first power supply circuit 103 and the second power supply circuit 104 do not operate, and the first receiving circuit 101 is disabled according to the voltage on the second node N2 (equivalent to the voltage on the first node N1).

In the third operation mode, namely mode 3, the first port P1 and the second port P2 respectively have the first port voltage V1 and the second port voltage V2. At this time, the voltage of the input end Nb1 of the second protection circuit 120 is boosted along with the first port voltage V1, so that the second driving circuit 121 turns off the transistor switches T21, T22.

In the fourth operation mode, namely mode 4, the processor MCU determines, according to the detection terminal in the first port P1, that power needs to be supplied for reading/writing data, so the processor MCU generates the first transmission signal S1. At this time, the first power supply circuit 103 is enabled according to the first transmission signal S1, and the first receiving circuit 101 is disabled according to the first transmission signal S1. The second receiving circuit 102 and the second power supply circuit 104 remain in a disabled state.

In the fifth operation mode, namely mode 5, the processor MCU determines, according to the detection terminal in the second port P2, that power needs to be supplied for reading/writing data, so the processor MCU generates the second transmission signal S2. At this time, the second power supply circuit 104 is enabled according to the second transmission signal S2, and the second receiving circuit 102 is disabled according to the second transmission signal S2. The first receiving circuit 101 and the first power supply circuit 103 remain in a disabled state.

In the sixth operation mode, namely mode 6, the processor MCU determines, according to the detection terminals in the first port P1 and the second port P2, that the two ports P1 and P2 need power for reading/writing data, so the processor MCU generates the first transmission signal S1 and the second transmission signal S2. At this time, the first power supply circuit 103 is enabled according to the first transmission signal S1, and the first receiving circuit 101 is disabled according to the first transmission signal S1. The second power supply circuit 104 is enabled according to the second transmission signal S2, and the second receiving circuit 102 is disabled according to the second transmission signal S2.

In the seventh operation mode, namely mode 7, the first port P1 has the first port voltage V1. The first receiving circuit 101 charges the power unit 105 according to the first port voltage V1. Furthermore, the processor MCU generates the second transmission signal S2 to enable the second power supply circuit 104. At the same time, the second receiving circuit 102 is disabled according to the second transmission signal S2 or the first port voltage V1. The first power supply circuit 103 remains in a disabled state.

In the eighth operation mode, namely mode 8, the second port P2 has the second port voltage P2. The second receiving circuit 102 charges the power unit 105 according to the second port voltage V2. Furthermore, the processor MCU generates the first transmission signal S1 to enable the first power supply circuit 103. At the same time, the first receiving circuit 101 is disabled according to the first transmission signal S1 or the voltage of the second node N2. The second power supply circuit 104 remains in a disabled state.

The above descriptions are merely preferred embodiments of the disclosure, and are not intended to limit the disclosure in any manner. Any person skilled in the art may make any equivalent replacement or modification to the technical means and technical content disclosed in the disclosure without departing from the scope of the technical means disclosed herein. All such changes belong to the content not departing from the technical means of the disclosure and fall within the protection scope of the disclosure.

What is claimed is:

1. A power control circuit, comprising:
    a first receiving circuit, electrically connected to a charging circuit and a first port, wherein the first receiving circuit is configured to charge a power unit through the charging circuit according to a first port voltage;
    a second receiving circuit, electrically connected to the charging circuit and a second port, wherein the second receiving circuit is configured to charge the power unit through the charging circuit according to a second port voltage, and the second receiving circuit is further configured to be disabled according to the first port voltage, wherein the second receiving circuit comprises a discharge branch, wherein the discharge branch is electrically connected to the first port and the second receiving circuit, and is configured to discharge the second receiving circuit according to a first transmission signal;
    a first power supply circuit, electrically connected to the power unit and the first port, wherein the first power supply circuit is enabled according to the first transmission signal to supply power to the first port; and
    a second power supply circuit, electrically connected to the power unit and the second port, wherein the second power supply circuit is enabled according to a second transmission signal to supply power to the second port.

2. The power control circuit according to claim 1, wherein the first receiving circuit comprises a first protection circuit, the second receiving circuit comprises a second protection circuit, and the second protection circuit is electrically connected to the first port to disable the second receiving circuit according to the first port voltage.

3. The power control circuit according to claim 2, wherein when the first power supply circuit receives the first transmission signal, the second protection circuit stops receiving the first port voltage.

4. The power control circuit according to claim 2, wherein the first protection circuit disables the first receiving circuit according to the first transmission signal.

5. The power control circuit according to claim 2, wherein the second protection circuit disables the second receiving circuit according to the second transmission signal.

6. The power control circuit according to claim 2, wherein the first protection circuit generates a first charging voltage according to the first port voltage, and the first charging voltage is configured to disable the second receiving circuit.

7. The power control circuit according to claim 2, wherein the first protection circuit comprises a first driving circuit; the output end of the first driving circuit is configured to turn on or off a first switch unit so as to transmit the first port voltage to the charging circuit; and the input end of the first driving circuit is configured to turn off the first switch unit according to the first transmission signal.

8. The power control circuit according to claim 7, wherein the second protection circuit comprises a second driving circuit; the output end of the second driving circuit is configured to turn on or off a second switch unit so as to transmit the second port voltage to the charging circuit; and the input end of the second driving circuit is configured to turn off the second switch unit according to the second transmission signal.

9. The power control circuit according to claim 8, wherein the second receiving circuit further comprises a second feedback circuit, and the second feedback circuit is electrically connected to the first protection circuit and the second protection circuit and configured to transmit the first charging voltage generated by the first protection circuit to the input end of the second driving circuit, so that the second driving circuit turns off the second switch unit.

10. The power control circuit according to claim 9, wherein the second feedback circuit comprises a second feedback switch, the second feedback switch is electrically connected to the input end and grounding end of the second driving circuit, and when the second receiving circuit charges the power unit through the charging circuit, the second feedback switch is turned on.

11. A power control circuit, comprising:
a first receiving circuit, electrically connected to a charging circuit and a first port, wherein the first receiving circuit is configured to generate a first charging voltage according to a first port voltage, and charge a power unit through the charging circuit;
a second receiving circuit, electrically connected to the charging circuit and a second port, wherein the second receiving circuit is configured to charge the power unit through the charging circuit according to a second port voltage, and the second receiving circuit is further configured to be disabled according to the first charging voltage, wherein the second receiving circuit comprises a discharge branch, wherein the discharge branch is electrically connected to the first port and the second receiving circuit, and is configured to discharge the second receiving circuit according to a first transmission signal;
a first power supply circuit, electrically connected to the power unit and the first port, wherein the first power supply circuit is enabled according to the first transmission signal to supply power to the first port; and
a second power supply circuit, electrically connected to the power unit and the second port, wherein the second power supply circuit is enabled according to a second transmission signal to supply power to the second port.

12. The power control circuit according to claim 11, wherein the first receiving circuit comprises a first protection circuit, the second receiving circuit comprises a second protection circuit, and the input end of the second protection circuit is electrically connected to the output end of the first protection circuit to disable the second receiving circuit according to the first charging voltage.

13. The power control circuit according to claim 12, wherein the other input end of the second protection circuit is electrically connected to the first port to disable the second receiving circuit according to the first port voltage.

14. The power control circuit according to claim 12, wherein when the first power supply circuit receives the first transmission signal, the second protection circuit stops receiving the first port voltage.

15. The power control circuit according to claim 12, wherein the first protection circuit disables the first receiving circuit according to the first transmission signal.

16. The power control circuit according to claim 12, wherein the second protection circuit disables the second receiving circuit according to the second transmission signal.

17. The power control circuit according to claim 12, wherein the first protection circuit comprises a first driving circuit; the output end of the first driving circuit is configured to turn on or off a first switch unit so as to transmit the first port voltage to the charging circuit; and the input end of the first driving circuit is configured to turn off the first switch unit according to the first transmission signal.

18. The power control circuit according to claim 17, wherein the second protection circuit comprises a second driving circuit; the output end of the second driving circuit is configured to turn on or off a second switch unit so as to transmit the second port voltage to the charging circuit; and the input end of the second driving circuit is configured to turn off the second switch unit according to the second transmission signal.

19. The power control circuit according to claim 18, wherein the second receiving circuit further comprises a second feedback circuit, and the second feedback circuit is electrically connected to the first protection circuit and the second protection circuit and configured to transmit the first charging voltage generated by the first protection circuit to the input end of the second driving circuit, so that the second driving circuit turns off the second switch unit.

20. The power control circuit according to claim 19, wherein the second feedback circuit comprises a second feedback switch, the second feedback switch is electrically connected to the input end and grounding end of the second driving circuit, and when the second receiving circuit charges the power unit through the charging circuit, the second feedback switch is turned on.

* * * * *